US012008883B2

(12) United States Patent
Shao et al.

(10) Patent No.: US 12,008,883 B2
(45) Date of Patent: Jun. 11, 2024

(54) ALARM-BASED PREVENTION AND CONTROL METHOD, INTERNET OF THINGS SYSTEM, AND MEDIUM FOR SAFETY RISK OF SMART GAS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Yuefei Wu, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/465,127

(22) Filed: Sep. 11, 2023

(65) Prior Publication Data

US 2023/0419811 A1 Dec. 28, 2023

(30) Foreign Application Priority Data

Jul. 21, 2023 (CN) ......................... 202310898714.8

(51) Int. Cl.
*G08B 21/12* (2006.01)
*F24F 11/30* (2018.01)
*G08B 21/24* (2006.01)

(52) U.S. Cl.
CPC .............. *G08B 21/12* (2013.01); *F24F 11/30* (2018.01); *G08B 21/24* (2013.01)

(58) Field of Classification Search
CPC ...................................................... G08B 21/12
See application file for complete search history.

(56) References Cited

U.S. PATENT DOCUMENTS 6,743,091 B2 * 6/2004 Meneely, Jr. .......... F24F 11/526 454/343
11,776,378 B2 * 10/2023 Shao ..................... H04L 67/125 340/632

(Continued)

FOREIGN PATENT DOCUMENTS

CN 116127396 A 5/2013
CN 204329083 U 5/2015

(Continued)

OTHER PUBLICATIONS

Notification to Grant Patent Right for Invention in Chinese Application No. 202310898714.8 dated Oct. 8, 2023, 5 pages.

(Continued)

*Primary Examiner* — Travis R Hunnings
(74) *Attorney, Agent, or Firm* — METIS IP LLC

(57) ABSTRACT

The embodiments of the present disclosure provide an alarm-based prevention and control method and an Internet of Things (IoT) system for a safety risk of smart gas, including: obtaining gas monitoring data based on a data acquisition instruction, and determining whether a gas leakage occurs; in response to a determination that the gas leakage occurs, generating a control instruction based on a fan operation strategy to control operation of a fan, and obtaining the gas monitoring data under the fan operation strategy, the fan being configured to remove leaking gas and assist in determining a type of the gas leakage; and generating a notification instruction based on the gas monitoring data in conjunction with an operating strategy of an indicator light, and controlling the indicator light to issue an alarm notification based on the notification instruction.

6 Claims, 4 Drawing Sheets

(56) References Cited

U.S. PATENT DOCUMENTS

| | | | | |
|---|---|---|---|---|
| 2002/0178738 | A1* | 12/2002 | Taira | F24F 11/30 62/181 |
| 2005/0212680 | A1* | 9/2005 | Uehigashi | G05D 1/0246 318/587 |
| 2009/0151652 | A1* | 6/2009 | Tian | F24H 9/205 340/632 |
| 2010/0330515 | A1* | 12/2010 | Ueki | F23N 5/242 340/632 |
| 2020/0167572 | A1* | 5/2020 | Morimoto | G06T 7/20 |
| 2022/0236133 | A1* | 7/2022 | Lee | G01M 3/04 |
| 2022/0397297 | A1* | 12/2022 | Foster | F24F 11/30 |
| 2023/0073685 | A1* | 3/2023 | Shao | G08B 17/10 |
| 2023/0125033 | A1* | 4/2023 | Shao | G06Q 10/20 705/7.22 |

FOREIGN PATENT DOCUMENTS

| | | | |
|---|---|---|---|
| CN | 107808499 | A | 3/2018 |
| CN | 110517456 | A | 11/2019 |
| CN | 111932840 | A | 11/2020 |
| CN | 115356978 | A | 11/2022 |
| CN | 115620490 | A | 1/2023 |
| WO | 2022120872 | A1 | 6/2022 |

OTHER PUBLICATIONS

The Second Office Action in Chinese Application No. 202310898714.8 dated Sep. 14, 2023, 29 pages.

Zhang, NA, A Study on the GPRS-based Serwer Gas Monitoring System, Chinese Master's Theses Full-text Database, 2007, 73 pages.

Li, Jiayue, Research on Building Fire Smoke Indentification and Personnel Evacuation System, Chinese Master's Theses Full-text Database, 2023, 77 pages.

Sheng, Yan, Research on Laboratory Safety Alarm Monitoring System Based on Single Chip Microcomputer and GPRS, Chinese Master's Theses Full-text Database, 2013, 90 pages.

* cited by examiner

ALARM-BASED PREVENTION AND CONTROL METHOD, INTERNET OF THINGS SYSTEM, AND MEDIUM FOR SAFETY RISK OF SMART GAS

CROSS-REFERENCE TO RELATED APPLICATIONS

This application claims priority of Chinese Patent Application No. 202310898714.8, filed on Jul. 21, 2023, the contents of which are hereby incorporated by reference to its entirety.

TECHNICAL FIELD

The present disclosure relates to the technical field of the Internet of Things, and in particular, to an alarm-based prevention and control method, Internet of Things (IoT) system, and medium for a safety risk of smart gas.

BACKGROUND

A gas system is a commonly used indoor energy supply system. For example, the gas system provides fuel to a water heater, a stove, etc. While residents are using gas, a gas leakage may occur. However, the gas leakage is an event with a low probability. Most residents do not know how to prevent and respond to the gas leakage, and are likely to adopt an inappropriate solution, which may lead to more serious personal and property losses.

In view of this, it is desirable to provide an alarm-based prevention and control method, an alarm-based prevention and control Internet of Things (IoT) system, and a medium for a safety risk of smart gas, which can automatically determine a degree of gas leakage, and send targeted suggestions and notifications for checking the gas leakage to a user terminal while preventing and treating the gas leakage.

SUMMARY

One of the embodiments of the present disclosure provides an alarm-based prevention and control method for a safety risk of smart gas. The method is performed by a smart gas safety management platform of an alarm-based prevention and control Internet of Things (IoT) system for a safety risk of smart gas, comprising: obtaining gas monitoring data based on a data acquisition instruction, and determining whether a gas leakage occurs; in response to a determination that the gas leakage occurs, generating a control instruction based on a fan operation strategy to control operation of a fan, and obtaining the gas monitoring data under the fan operation strategy, the fan being configured to remove leaking gas and assist in determining a type of the gas leakage; and generating a notification instruction based on the gas monitoring data in conjunction with an operating strategy of an indicator light, and controlling the indicator light to issue an alarm notification based on the notification instruction.

One of the embodiments of the present disclosure provides an alarm-based prevention and control Internet of Things (IoT) system for a safety risk of smart gas. The IoT system includes a smart gas user platform, a smart gas service platform, a smart gas safety management platform, a smart gas indoor equipment sensor network platform, and a smart gas indoor equipment object platform. The smart gas safety management platform includes a plurality of smart gas indoor safety management sub-platforms and a smart gas data center. The smart gas indoor equipment sensor network platform is configured to interact with the smart gas data center and the smart gas indoor equipment object platform. The smart gas indoor equipment object platform is configured to obtain the gas monitoring data based on the data acquisition instruction. The smart gas safety management platform is configured to obtain the gas monitoring data from the smart gas data center and determine whether the gas leakage occurs; in response to a determination that the gas leakage occurs, generate, based on a fan operation strategy, a control instruction to control operation of a fan, and obtain gas monitoring data under different fan operation strategies, the fan being configured to remove the leaking gas; generate a notification instruction based on the gas monitoring data in conjunction with an operating strategy of an indicator light; and transmit the notification instruction to the smart gas service platform via the smart gas data center. The smart gas service platform is configured to upload the notification instruction to the smart gas user platform, and the smart gas user platform issues an alarm notification based on the notification instruction.

One of the embodiments of the present disclosure provides a non-transitory computer-readable storage medium storing computer instructions, wherein when reading the computer instructions in the storage medium, a computer performs the alarm-based prevention and control method for the safety risk of smart gas.

The embodiments of the present disclosure include but are not limited to the following beneficial effects. (1) By obtaining the gas monitoring data, it is possible to promptly control the fan to discharge the leaking gas when the gas leakage occurs. Furthermore, real-time monitoring of the gas monitoring data after the operation of the fan enables dynamic control of the indicator light to flicker to provide a timely alarm, alerting users to an occurrence and a situation of the gas leakage, and ensuring the safety of gas usage. (2) According to the gas usage and the situation of gas leakage, the indicator light can give an alarm by showing different flicker states and flicker frequencies, thereby intuitively and effectively alerting the users of the gas leakage; moreover, determining a reminder message based on the flicker states and flicker frequencies can provide the users with a more specific situation of the gas leakage, facilitating making accurate reflection and determination.

BRIEF DESCRIPTION OF THE DRAWINGS

The present disclosure will be further illustrated by way of exemplary embodiments, which will be described in detail with the accompanying drawings. These embodiments are non-limiting, and in these embodiments, the same number indicates the same structure, wherein.

DETAILED DESCRIPTION

Figure 1:
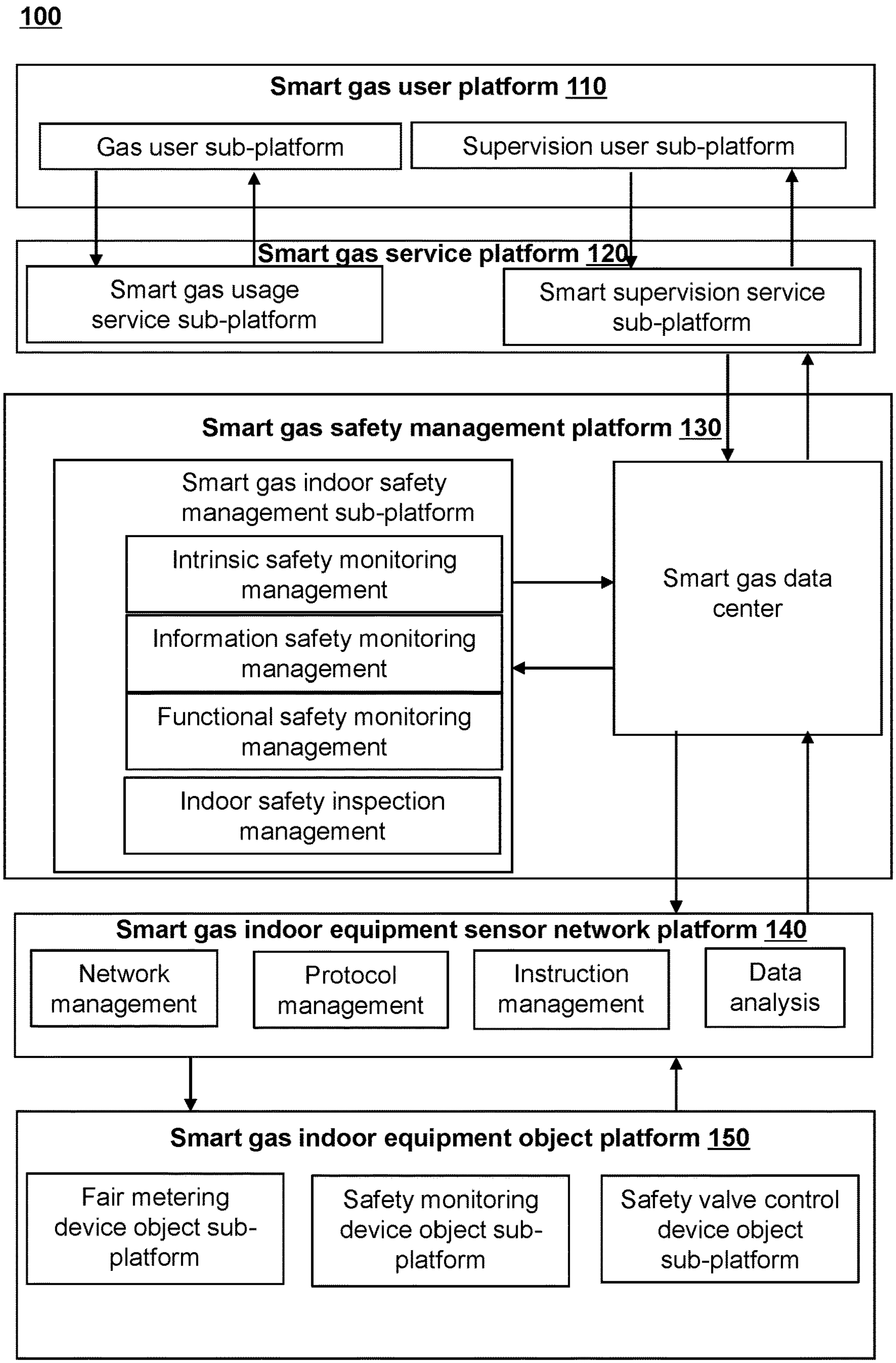
FIG. 1 is a schematic diagram illustrating an exemplary structure of an alarm-based prevention and control Internet of Things (IoT) system for a safety risk of smart gas according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", "an" and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

FIG. 1 is a schematic diagram illustrating an exemplary structure of an alarm-based prevention and control Internet of Things (IoT) system for a safety risk of smart gas according to some embodiments of the present disclosure. The alarm-based prevention and control IoT system for the safety risk of smart gas (hereinafter referred to as an IoT system 100) in the embodiments of the present disclosure will be described in detail below. It should be noted that the following embodiments are only used to explain the present disclosure, and do not constitute a limitation to the present disclosure.

As shown in FIG. 1, the IoT system 100 may include a smart gas user platform 110, a smart gas service platform 120, a smart gas safety management platform 130, a smart gas indoor equipment sensor network platform 140, and a smart gas indoor equipment object platform 150.

The smart gas user platform 110 refers to a platform for interacting with a user, and may be configured as a terminal device for feeding back gas abnormality information and a solution corresponding to the gas abnormality information to the user.

In some embodiments, the smart gas user platform 110 may include a plurality of smart gas user sub-platforms. For example, the smart gas user platform 110 may include a gas user sub-platform and a supervision user sub-platform. The gas user sub-platform may be a platform that provides a gas user with gas data and a solution to a gas problem. The gas user may be an industrial gas user, a commercial gas user, an ordinary gas user, etc. The supervision user sub-platform may be a platform for a supervision user to supervise operation of the entire IoT system. The supervision user may be personnel of a safety management department.

In some embodiments, the smart gas user platform 110 may feed information back to the user through the terminal device. For example, the smart gas user platform 110 may feed an alarm notification issued based on a notification instruction back to the gas user based on the gas user sub-platform.

The smart gas service platform 120 may be a platform that provides the user with safe gas usage and a safety supervision service. The smart gas service platform 120 may obtain the notification instruction, or the like, from the smart gas safety management platform 130 (e.g., a smart gas data center), and send the notification instruction, or the like, to the smart gas user platform 110.

In some embodiments, the smart gas service platform 120 may include a plurality of smart gas service sub-platforms. For example, the smart gas service platform 120 may include a smart gas usage service sub-platform and a smart supervision service sub-platform. The smart gas usage service sub-platform may be a platform that provides a gas usage service for the gas user. The smart supervision service sub-platform may be a platform that provides a supervision need for the supervision user.

In some embodiments, the smart gas service platform 120 may send the notification instruction to the gas user sub-platform based on the smart gas usage service sub-platform.

The smart gas safety management platform 130 may be a platform for coordinating and integrating a connection and collaboration between various functional platforms. The smart gas safety management platform 130 may gather all information of an IoT, and provide functions of perception management and control management for an operating system of the IoT.

In some embodiments, the smart gas safety management platform 130 may include a plurality of smart gas indoor safety management sub-platforms and a smart gas data center.

The smart gas indoor safety management sub-platform may be a platform for managing the safety of the gas usage. In some embodiments, the smart gas indoor safety management sub-platform may include but is not limited to, an intrinsic safety monitoring management module, an information safety monitoring management module, a functional safety monitoring management module, and an indoor safety inspection management module. The smart gas indoor safety management sub-platform may analyze and process gas safety information through the aforementioned management modules.

The smart gas data center may be configured to summarize and store all operating information of the alarm-based prevention and control IoT system 100 for the safety risk of smart gas. In some embodiments, the smart gas data center may be configured as a storage device for storing data related to risk prevention and control of smart gas, such as gas monitoring data, an operating strategy of an indicator light, a fan operation strategy, etc.

In some embodiments, the smart gas safety management platform 130 may exchange information with the smart gas service platform 120 and the smart gas sensor network platform 140 respectively through the smart gas data center. For example, the smart gas data center may send the notification instruction to the smart gas service platform 120. As another example, the smart gas data center may send an instruction for obtaining the gas monitoring data to the smart gas sensor network platform 140 to obtain the gas monitoring data acquired by the smart gas indoor equipment object platform 150.

In some embodiments, the smart gas safety management platform 130 may implement an alarm-based prevention and control method for a safety risk of smart gas based on the gas monitoring data and the fan operation strategy. More information regarding the alarm-based prevention and control method for the safety risk of smart gas may be found in FIG. 2 and related descriptions thereof.

The smart gas indoor equipment sensor network platform 140 may be a functional platform for managing sensor communication. In some embodiments, the smart gas indoor equipment sensor network platform 140 may be configured as a communication network and a gateway, so as to realize functions of perception information sensor communication and control information sensor communication.

In some embodiments, the smart gas indoor equipment sensor network platform 140 may include a network management module, a protocol management module, an instruction management module, and a data analysis module, etc. The smart gas indoor equipment sensor network platform 140 may obtain operation information (e.g., the gas monitoring data) of gas indoor equipment and gas pipeline network equipment through the aforementioned management modules.

The smart gas indoor equipment object platform 150 may be a functional platform for generating the perception information and executing the control information. In some embodiments, the smart gas indoor equipment object platform 150 may include a plurality of gas indoor equipment object sub-platforms, for example, a fair metering device object sub-platform, a safety monitoring device object sub-platform, and a safety valve control device object sub-platform, etc. In some embodiments, the gas indoor equipment object sub-platform may be configured as various gas indoor equipment and monitoring devices of the gas user, such as a gas meter, an indoor gas pipeline, and a gas leakage alarm.

In some embodiments, the smart gas indoor equipment object platform 150 may obtain gas safety information through at least one sub-platform. For example, the smart gas indoor equipment object platform 150 may obtain the gas monitoring data through the gas leakage alarm.

Figure 2:
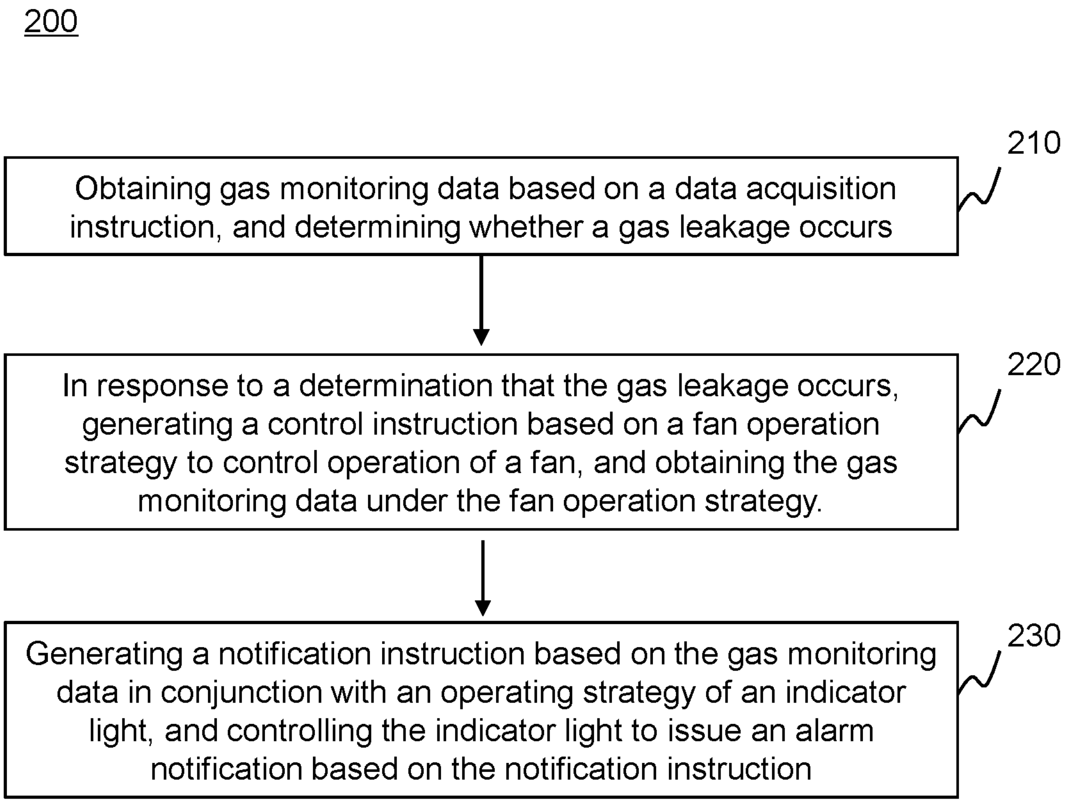
FIG. 2 is a flowchart illustrating an exemplary alarm-based prevention and control method for a safety risk of smart gas according to some embodiments of the present disclosure.

More details regarding parameters such as the gas monitoring data, the fan operation strategy, the operating strategy of the indicator light, and the notification instruction may be found elsewhere in the present disclosure (e.g., FIG. 2, etc.).

It should be noted that the above descriptions of the alarm-based prevention and control Internet of Things (IoT) system 100 for the safety risk of smart gas and modules thereof are only for convenience of description, and do not limit the present disclosure to the scope of the examples cited. It can be understood that for those skilled in the art, after understanding the principle of the system, it is possible to combine various modules arbitrarily, or form a subsystem to connect with other modules without departing from this principle.

FIG. 2 is a flowchart illustrating an exemplary alarm-based prevention and control method for a safety risk of smart gas according to some embodiments of the present disclosure. As shown in FIG. 2, a process 200 may include the following operations. In some embodiments, the process 200 may be executed by a smart gas safety management platform. More details regarding the smart gas safety management platform may be found in FIG. 1 and related descriptions thereof.

In 210, gas monitoring data may be obtained based on a data acquisition instruction, and it may be determined whether a gas leakage occurs.

The data acquisition instruction refers to an instruction used to instruct a smart gas indoor equipment object platform to obtain the gas monitoring data, which may be generated in real-time.

The gas monitoring data may reflect a gas state within a certain period of time. In some embodiments, the gas monitoring data may include data such as a gas concentration, a change rate of the gas concentration, and a volume of gas usage.

In some embodiments, the smart gas safety management platform may obtain the gas monitoring data through the smart gas indoor equipment object platform. Exemplarily, the smart gas safety management platform may obtain the gas monitoring data acquired by the smart gas indoor equipment object platform and uploaded to the smart gas data center.

More details regarding the smart gas indoor equipment object platform may be found in FIG. 1 and related descriptions thereof.

In some embodiments, the smart gas safety management platform may determine whether the gas leakage occurs in a variety of ways. For example, the smart gas safety management platform may determine that the gas leakage occurs when detecting that the gas concentration and/or the change rate of the gas concentration reaches a preset threshold.

In 220, in response to a determination that the gas leakage occurs, a control instruction may be generated based on a fan operation strategy to control operation of a fan, and the gas monitoring data under the fan operation strategy may be obtained.

The fan may be configured to remove leaking gas and assist in determining a type of the gas leakage. In some embodiments, the smart gas safety management platform may send the control instruction to the fan, so that the fan may operate according to the fan operation strategy. More details regarding the fan configured to assist in determining the type of the gas leakage may be found in the relevant descriptions below (e.g., FIG. 3).

The fan operation strategy may be used to guide the operation of the fan. In some embodiments, the fan operation strategy may include at least one of an operating power, an operating duration, or a rotation direction of the fan.

The greater the operating power and/or the longer the operating duration of the fan, the higher a gas removal efficiency. The rotation direction of the fan may affect an area where the fan exhausts gas and a direction in which the gas is removed.

In some embodiments, the smart gas safety management platform may obtain the fan operation strategy based on the gas monitoring data by querying a table or vector matching. For example, the smart gas safety management platform may obtain the fan operation strategy by querying a preset table of fan strategy based on the gas monitoring data. The preset table of fan strategy may include various gas monitoring data and fan operation strategies corresponding to the gas monitoring data. The preset table of fan strategy may be constructed based on historical gas leakage data and fan operation conditions corresponding to the historical gas leakage data.

In some embodiments, the smart gas safety management platform may also determine a leakage risk value based on gas equipment usage data, and determine the fan operation strategy based on the leakage risk value.

The gas equipment usage data may reflect a usage state of gas equipment. In some embodiments, the gas equipment usage data may include one or more of an age, an aging degree, and maintenance data of the gas equipment.

In some embodiments, the smart gas safety management platform may obtain the gas equipment usage data based on the smart gas indoor equipment object platform. In some embodiments, the gas equipment usage data may also be pre-stored in the smart gas data center, and the smart gas safety management platform may directly retrieve the gas equipment usage data when needed.

The leakage risk value may be used to assess a probability of the gas leakage of the gas equipment. The leakage risk value may be influenced by the gas equipment usage data. The longer the age of the gas equipment, the higher the aging degree, and the more maintenance times, the greater the leakage risk value.

In some embodiments, the smart gas safety management platform may determine the leakage risk value in various ways. For example, the smart gas safety management platform may construct a feature vector based on the gas equipment usage data, and obtain a historical feature vector whose vector distance from the feature vector meets a distance threshold by searching a risk vector database. The smart gas safety management platform may determine a reference leakage risk value stored in association with the historical feature vector as the leakage risk value. The risk vector database may store a plurality of historical feature vectors and a plurality of reference leakage risk values corresponding to the plurality of historical feature vectors. The historical feature vector may be constructed based on historical gas equipment usage data.

In some embodiments, when a plurality of historical feature vectors whose vector distances from the feature vector meets the distance threshold are retrieved, the smart gas safety management platform may determine the leakage risk value by averaging a plurality of reference leakage risk values corresponding to the plurality of historical feature vectors.

In some embodiments, in response to a determination that the leakage risk value meets a preset condition, the smart gas safety management platform may determine the fan operation strategy corresponding to the leakage risk value. The preset condition may include that the leakage risk value reaches a preset risk threshold.

In some embodiments, the smart gas safety management platform may determine the fan operation strategy based on the leakage risk value in various ways. For example, the smart gas safety management platform may obtain the fan operation strategy by querying the preset table of fan strategy based on the leakage risk value. The preset table may include a plurality of leakage risk values and fan operation strategies corresponding to the plurality of leakage risk values. The preset table may be constructed based on the historical leakage risk values and historical fan operation conditions corresponding to the historical leakage risk values.

The control instruction may be used to drive the fan to operate. In some embodiments, the control instruction may include a combination of instructions to control power, a direction, etc. of the fan. In some embodiments, the smart gas safety management platform may generate a control instruction based on the fan operation strategy, and control the operation of the fan using the control instruction.

Since gas may be discharged after the fan is turned on, the gas concentration may change. The smart gas safety management platform may obtain the gas monitoring data under the fan operation strategy in real time to determine a type of the gas leakage. More details regarding the type of the gas leakage may be found in FIG. 3 and its related descriptions thereof. More details regarding obtaining the gas monitoring data may be found in 210 and related descriptions thereof.

In 230, a notification instruction may be generated based on the gas monitoring data in conjunction with an operating strategy of an indicator light, and the indicator light may be controlled to issue an alarm notification based on the notification instruction.

The operating strategy of the indicator light may be used to guide operation of the indicator light to remind or alarm based on a situation of the gas leakage. In some embodiments, the operating strategy of the indicator light may include at least one of a flicker state, a flicker frequency, or a flicker duration.

In some embodiments, the smart gas safety management platform may obtain the operating strategy of the indicator light in various ways based on the gas monitoring data. For example, the smart gas safety management platform may obtain the operating strategy of the indicator light by querying a preset table of operating strategy of indicator light based on the gas monitoring data. The preset table may include various gas monitoring data and operating strategies of indicator lights corresponding to the various gas monitoring data, which may be constructed based on the historical gas leakage data.

Figure 4:
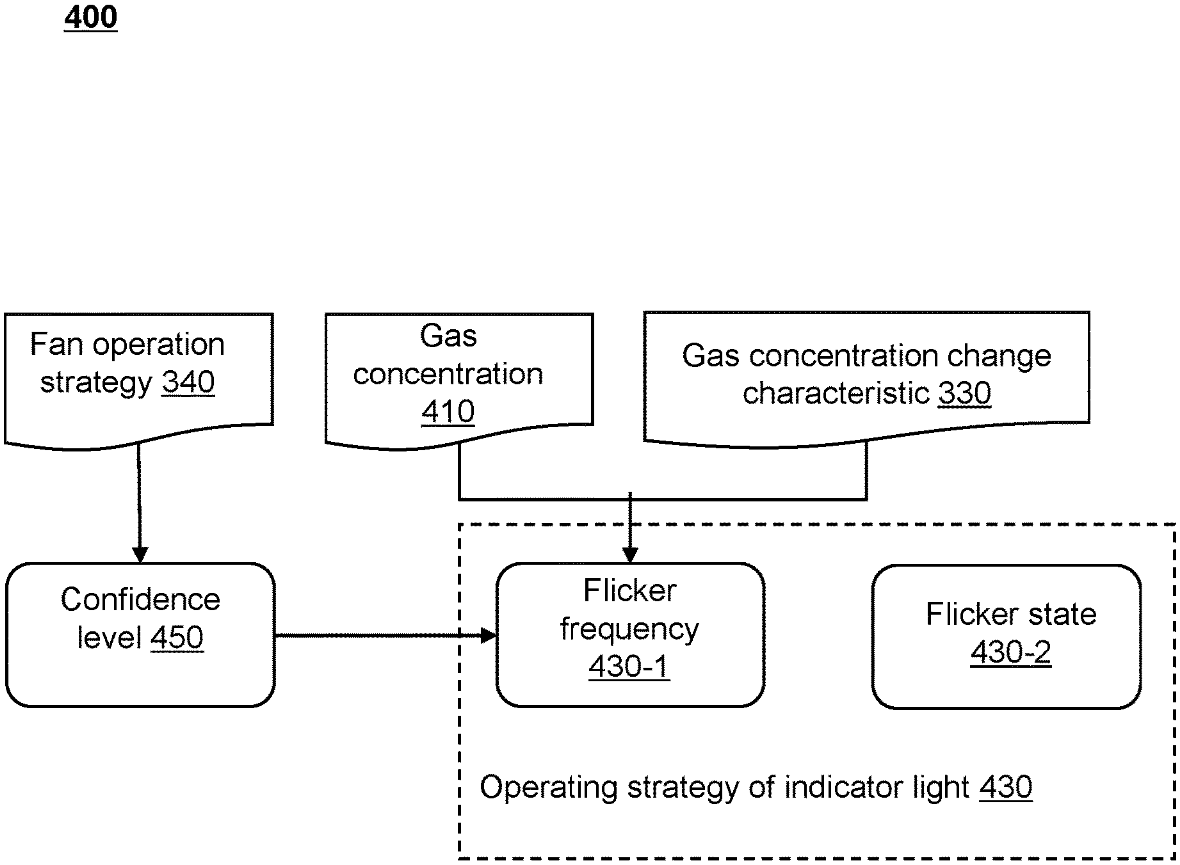
FIG. 4 is a schematic diagram illustrating an exemplary determination of an operating strategy of an indicator light according to some embodiments of the present disclosure.

More ways regarding obtaining the operating strategy of the indicator light may be found in FIG. 4 and related descriptions thereof.

The notification instruction may be used to drive the indicator light to work according to the operating strategy of indicator light, so as to remind the user of the gas leakage and a degree of the gas leakage.

In some embodiments, the smart gas safety management platform may generate a notification instruction according to the operating strategy of indicator light.

In some embodiments, the smart gas safety management platform may control the flicker state, the flicker frequency, and the flicker duration of the indicator light through the notification instruction, so that the indicator light may operate according to the operating strategy of indicator light and issue the alarm notification.

In the embodiments of the present disclosure, by obtaining the gas monitoring data, it is possible to promptly control the fan to remove the leaking gas when the gas leakage occurs. Real-time monitoring of the gas monitoring data after the operation of the fan allows for dynamic control of the indicator to flick and alarm, effectively alerting the user of the occurrence and the situation of the gas leakage in time, and ensuring the safety of gas usage.

In some embodiments, the smart gas safety management platform may determine the type of the gas leakage based on the fan operation strategy and an operating condition of the indicator light. The type of the gas leakage may include a continuous leakage and an occasional leakage.

The continuous leakage refers to continuous gas leakage. The occasional leakage means that the gas leakage occurs within a certain period of time, but does not occur in another period of time (e.g., a time period after the fan is operated). In some embodiments, the occasional leakage may also include a misjudgment caused by an accidental event such as failure of a gas monitoring device, failure of ignition of gas equipment, or the like. For example, no gas leakage actually occurs, but a faulty gas monitoring device determines that the gas leakage occurs based on monitoring data of the faulty gas monitoring device.

The operating condition of the indicator light may include a change of the working state of the indicator light within a certain period of time, which may be used to reflect a gas concentration change within the certain period of time. In some embodiments, the operating condition of the indicator light may include whether the indicator light is turned on, whether the flicker frequency is low, or the like.

In some embodiments, the smart gas safety management platform may determine the operating condition of the indicator light within the certain period of time based on the operating strategy of indicator light in the period of time.

In some embodiments, the smart gas safety management platform assisting in determining the type of the gas leakage through the fan may include: determining the type of the gas leakage based on the fan operation strategy and the change of the operating condition of the indicator light within the certain period of time.

For example, assuming that the indicator light alarms at a time point T1 and the fan starts to operate. When the fan stops operation/reduces a rotation speed at a time point T2 and the indicator light is still alarming, it is indicated that the gas is still leaking, and the type of the gas leakage is the continuous leakage. That is, the operation of the fan removes some of the leaking gas, but the gas concentration does not reduce much due to the continuous gas leakage, causing the indicator light to keep alarming, wherein T1<T2.

As another example, the indicator light alarms and the fan starts to operate. When the fan stops operation or reduces the rotation speed, the indicator light stops alarming, which means that the gas has been removed by the fan and there is no new gas leakage, i.e., the gas leakage occurs only at a certain time point, and the type of the gas leakage is the occasional leakage.

In some embodiments of the present disclosure, the type of the gas leakage may be determined through the change of the operating condition of the fan and the indicator light, thereby adjusting and optimizing the fan operation strategy in a targeted manner, discharging the leaking gas in time, and improving the usage safety of a gas system.

Figure 3:
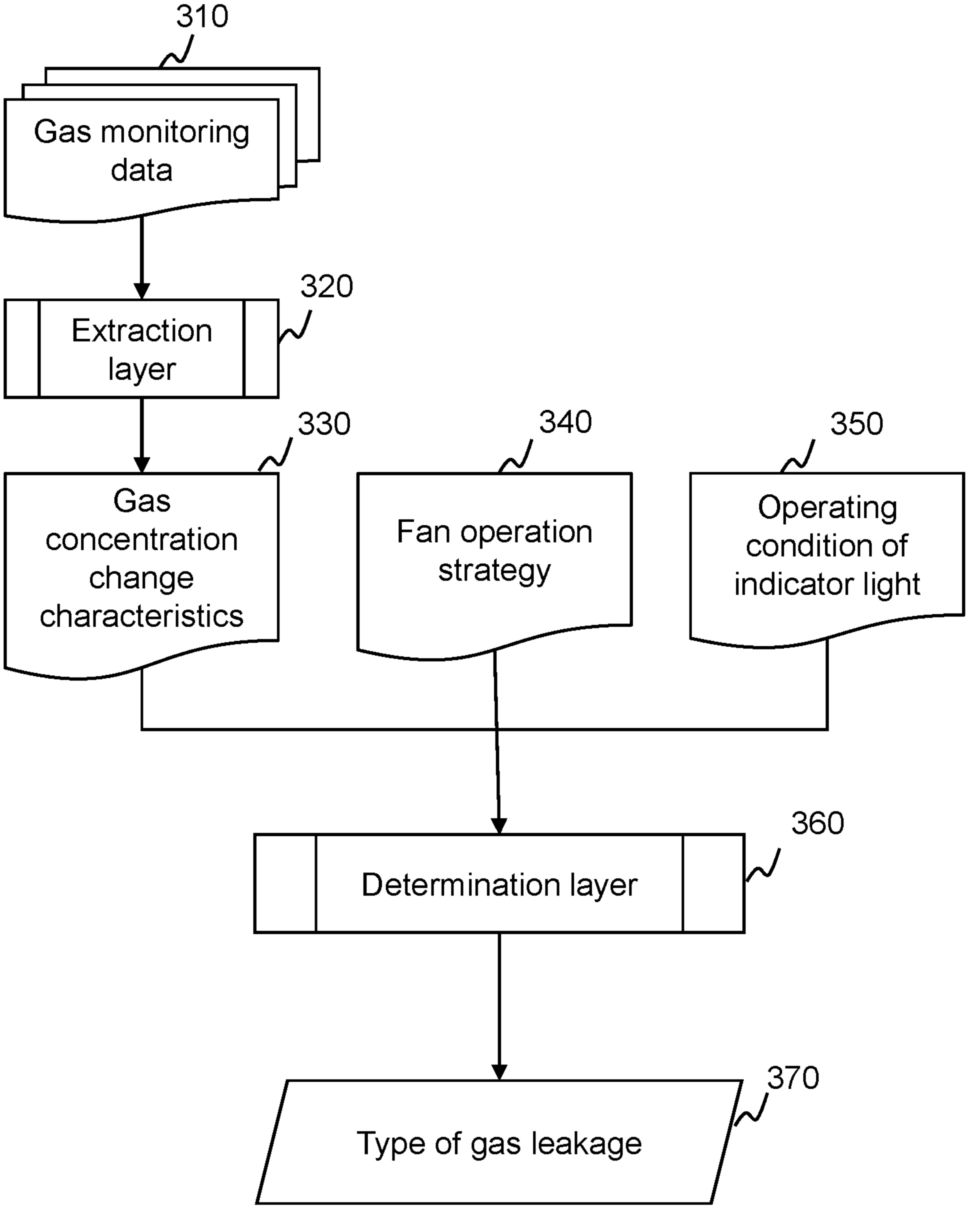
FIG. 3 is a schematic diagram illustrating an exemplary determination of a type of a gas leakage based on a type determination model according to some embodiments of the present disclosure.

FIG. 3 is a schematic diagram illustrating an exemplary determination of a type of a gas leakage based on a type determination model according to some embodiments of the present disclosure;

In some embodiments, as shown in FIG. 3, the smart gas safety management platform 130 may determine a type of a gas leakage 370 by processing a fan operation strategy 340, an operating condition of an indicator light 350, and gas monitoring data 310 of at least one time point based on the type determination model.

More information regarding the fan operation strategy 340 may be found in the related descriptions of FIG. 2.

The type determination model may be a machine learning model with a custom structure below, or other neural network models, such as a recurrent neural network (RNN).

In some embodiments of the present disclosure, the type of the gas leakage may be determined using the type determination model, and the accuracy and efficiency of determining the type of the gas leakage may be improved using the self-learning ability of the machine learning model.

In some embodiments, as shown in FIG. 3, the type determination model may include an extraction layer 320 and a determination layer 360. The extraction layer 320 may be configured to determine gas concentration change characteristics 330 by processing the gas monitoring data 310 of at least one time point. The determination layer 360 may be configured to determine the type of the gas leakage 370 by processing the fan operation strategy 340, the operating condition of the indicator light 350, and the gas concentration change characteristics 330.

In some embodiments, a network structure of the extraction layer 320 and the determination layer 360 may be a neural network (NN), a recurrent neural network (RNN), or the like.

The gas concentration change characteristics 330 may reflect a change rule of a gas concentration within a preset time period, for example, a change rate of the gas concentration, a change range of the gas concentration, or the like. The preset time period refers to a period of time after the gas leakage occurs. A duration of the preset time period may be set by default in the system.

In some embodiments, an output of the extraction layer 320 of the type determination model may serve as an input of the determination layer 360. The extraction layer 320 and the determination layer 360 may be obtained through joint training.

In some embodiments, training data for the joint training of the type determination model may include sample gas monitoring data, sample fan operation strategies, and sample operating conditions of indicator lights, which may be obtained by simulating fan operation strategies set for different types of gas leakage and operating conditions of indicator lights corresponding to the fan operation strategies, etc. through experiments. Training labels may be sample types of gas leakage, which may be determined based on actual types of gas leakage during simulation.

In some embodiments, the smart gas safety management platform may obtain initial gas concentration change characteristics vectors by inputting the sample gas monitoring data into an initial extraction layer; and obtain initial types of the gas leakage by inputting the initial gas concentration change characteristics vectors, the sample fan operation strategies, and the sample operating conditions of the indicator lights into the initial determination layer. A loss function may be constructed based on the initial types of the gas leakage and the training labels, and parameters of the initial extraction layer and the initial determination layer may be updated synchronously using the loss function. A trained extraction layer and a trained determination layer, i.e., a trained type determination model, may be obtained by updating the parameters.

In some embodiments of the present disclosure, by setting the type determination model with the extraction layer and the determination layer to process different data respectively, the accuracy and efficiency of data processing can be improved, and the accuracy of model prediction can be improved. Moreover, obtaining the type determination model through the joint training can solve the problem that the labels are not easy to obtain when the extraction layer is trained alone, and at the same time improve the model training efficiency and model performance.

In some embodiments, the smart gas safety management platform may determine the operating strategy of the indicator light through a preset manner based on a gas concentration and gas concentration change characteristics, and historical gas leakage data within a preset time period. More contents regarding the preset time period may be found in FIG. 3 and related descriptions thereof.

The gas concentration may be a gas concentration monitored at a time when the gas leakage just occurs. In some embodiments, the smart gas safety management platform may obtain initially monitored gas concentration from the gas monitoring data based on monitoring time information corresponding to the gas monitoring data.

The gas concentration change characteristics may be obtained based on the extraction layer 320. More details may be found in FIG. 3 and related descriptions thereof.

The historical gas leakage data may be data of gas leakage occurred in history. For example, the historical gas leakage data may include a historical gas concentration of a historical gas leakage, historical gas concentration change characteristics within a historical time period since the historical leakage, and a corresponding historical alarm strategy. The historical time period may be the same as the preset time period in duration. In some embodiments, the smart gas safety management platform may obtain the historical gas leakage data from the smart gas data center or a network platform.

In some embodiments, the preset manner may include one or more of querying a table and vector matching.

For example, the smart gas safety management platform may construct a gas feature vector based on the gas concentration and the gas concentration change characteristics, and determine a historical gas feature vector whose vector distance from the gas feature vector meets a distance threshold by searching a vector database. The smart gas safety management platform may obtain a historical alarm strategy corresponding to the historical gas feature vector, and determine the operating strategy of the indicator light based on the historical alarm strategy. A plurality of historical gas feature vectors and historical alarm strategies corresponding to the plurality of historical gas features may be stored in the vector database. The historical gas feature vector may be constructed based on the historical gas concentration and the historical gas concentration change characteristics in the historical gas leakage data.

FIG. 4 is a schematic diagram illustrating an exemplary determination of an operating strategy of an indicator light according to some embodiments of the present disclosure.

In some embodiments, as shown in FIG. 4, an operating strategy of an indicator light 430 may include a flicker frequency 430-1 and a flicker state 430-2.

The flicker state 430-2 may include off, on, continuous flicker, intermittent flicker, or the like. In some embodiments, a combination of different flicker frequencies 430-1 and different flicker states 430-2 may correspond to a different reminder message. A specific implementation of the reminder message may be found in the following related description.

In some embodiments, as shown in FIG. 4, the flicker frequency 430-1 may be related to a gas concentration 410 and gas concentration change characteristic 420. For example, the higher the gas concentration 410, the higher the flicker frequency 430-1; or the greater a change frequency of the gas concentration change characteristics 420, the higher the flicker frequency 430-1.

In some embodiments, a smart gas safety management platform may obtain a gas concentration characteristic value by performing weighted summation on an influence degree of the gas concentration 410 on the flicker frequency 430-1 and an influence degree of the gas concentration change characteristics 420 on the flicker frequency 430-1, and then determine the flicker frequency 430-1 based on the gas concentration characteristic value. The larger the gas concentration characteristic value, the larger the flicker frequency 430-1. The gas concentration characteristic value may be used to reflect a joint influence of the gas concentration 410 and the gas concentration change characteristics 420 on the flicker frequency 430-1.

In some embodiments, the smart gas safety management platform may also determine a final flicker frequency 430-1 by averaging a flicker frequency corresponding to the gas concentration 410 and a flicker frequency corresponding to the gas concentration change characteristics 420.

In some embodiments, the flicker state 430-2 and the flicker frequency 430-1 may be controlled by a smart socket.

In some embodiments, the smart socket may be set between an indicator light and a power supply to control the flicker state 430-2 and the flicker frequency 430-1 of the indicator light by controlling data such as a current magnitude and a power frequency of the indicator light. In some embodiments, the smart gas safety management platform may send a notification instruction and/or the operating strategy of the indicator light 430 to the smart socket, so that the smart socket may control the flicker state 430-2 and the flicker frequency 430-1 of the indicator light. In some embodiments, a plurality of smart sockets may be set at various locations in a home environment, for example, locations where users often stay, locations without shelter, or the like. The users may place the indicator light on the smart socket at a suitable position based on their needs, so as to receive a prompt from the indicator light in time.

In the embodiments of the present disclosure, the indicator light may be remotely controlled through the smart socket, so that the indicator light can operate according to the required flicker state 430-2 and flicker frequency 430-1. In addition, an installation location of the indicator light is movable, which is convenient and flexible for the users to discover the gas leakage in various ways, thereby improving the timeliness of gas leakage monitoring and early warning. Moreover, through different combinations of the flicker state 430-2 and the flicker frequency 430-1 of the indicator light, various alarm reminders may be performed, so that the users can timely and accurately determine a severity of the gas leakage based on the flicker state 430-2 and the flicker frequency 430-1, thereby improving the safety of gas usage.

In some embodiments, the indicator light may be integrated with a gas alarm, and the smart gas safety management platform may send the notification instruction and/or the operating strategy of the indicator light 430 to the gas alarm. The smart gas safety management platform may control a flicker of the indicator light through the alarm, and the alarm may realize a sound and light alarm by emitting an alarm sound.

In some embodiments, the flicker frequency 430-1 may also include a confidence level 450. As shown in FIG. 4, the smart gas safety management platform may also determine the confidence level 450 of the flicker frequency 430-1 based on a fan operation strategy 440.

In some embodiments, the confidence level 450 may be used to reflect an accuracy of a corresponding flicker frequency 430-1 under different operating conditions of a fan. After the fan is operated, the fan may change a direction and a velocity of an air flow, resulting in changes gas concentrations in different areas subsequently, making the monitored gas monitoring data change in real time, and affecting the accuracy of the flicker frequency 430-1 of the indicator light.

For example, if power of the fan is large, gas will be quickly exhausted away, making a gas monitoring device fail to monitor enough gas concentration, so that the indicator light does not issue an early warning, the confidence level 450 of the flicker frequency 430-1 of the indicator light is relatively low, and the flicker frequency 430-1 needs to be increased.

As another example, if the power of the fan is small and an operation duration of the fan is short, and the currently monitored gas concentration is also low, it is indicated that a gas concentration of the leaking gas in this area is not high, then the confidence level 450 of the flicker frequency 430-1 determined based on the gas concentration of the leaking gas is relatively high, and the flicker frequency 430-1 may be fine-adjusted or not adjusted.

In some embodiments, the smart gas safety management platform may determine the confidence level 450 based on the fan operation strategy 440 in various ways. For example, the smart gas safety management platform may determine the confidence level of the flicker frequency based on the fan operation strategy 440 and a gas concentration before and after the fan is operated based on the fan operation strategy 440. If the operating power of the fan in the fan operation strategy 440 is very high, the duration is very long, and the gas concentration changes greatly after the operation, it means that the confidence level of the flicker frequency of the indicator light determined based on the gas concentration before the operation of the fan is low.

The smart gas safety management platform may determine the confidence level 450 by querying a preset table of confidence level based on the fan operation strategy, the gas concentration before operation, and a predicted gas concentration at a future time point after operation. The preset table of confidence level may be determined based on experience.

In some embodiments, the smart gas safety management platform may monitor the gas concentration under the fan operation strategy in real time, and determine a gas concentration reduction amount per unit time within a certain period of time. The smart gas safety management platform may determine a total gas concentration reduction amount by multiplying the gas concentration reduction amount per unit time by a duration from an initial monitoring time to a future time point. The smart gas safety management platform may determine the gas concentration 410 at the future time point by subtracting the total gas concentration reduction amount from an initially monitored gas concentration.

It can be understood that when the gas leakage is the continuous leakage, the gas concentration reduction amount per unit time may be a gas concentration of gas exhausted by the fan minus a gas concentration of the continuous leakage per unit time. If the gas leakage is the occasional leakage, the gas concentration reduction amount per unit time is equal to the gas concentration of gas exhausted by the fan.

In some embodiments, the smart gas safety management platform may adjust a flicker frequency whose confidence level reaches a preset threshold. In some embodiments, the smart gas safety management platform may also preset an adjustment value for each confidence level interval, obtain a corresponding adjustment value based on the confidence level interval where the confidence level is located, and adjust the flicker frequency based on the adjustment value. The lower the confidence level interval, the larger the corresponding adjustment value.

In the embodiments of the present disclosure, considering the influence of the fan on the gas concentration, the flicker frequency may be adjusted by introducing the confidence level, so that the indicator light can give an alarm more accurately, and the safety of gas usage can be further improved.

In some embodiments, the smart gas safety management platform may send the reminder message to a user terminal based on the flicker state 430-2 and the flicker frequency 430-1 of the indicator light.

The reminder message refers to a reminder message of the gas leakage corresponding to the flicker state 430-2 and the flicker frequency 430-1 (e.g., whether the gas leakage occurs, the gas concentration, etc.). For example, if the flicker state 430-2 is off, it means that no reminder message is issued. If the flicker state 430-2 is on, it indicates that the gas leakage occurs. The higher the flicker frequency 430-1, the higher the gas concentration 410.

In some embodiments, the smart gas safety management platform may preset a corresponding relationship between the reminder message and the gas concentration 410 and a corresponding relationship between the reminder message and the gas concentration change characteristics 420 in advance. For example, a gas concentration A may correspond to a flicker frequency a; and a gas concentration B may correspond to a flicker frequency b. The smart gas safety management platform may determine the reminder message based on the aforementioned corresponding relationships and according to the flicker state and/or the flicker frequency 430-1.

In some embodiments, the smart gas safety management platform may send the reminder message to the user terminal through a smart gas user platform.

By sending the reminder message to the user terminal, the user can be provided with a more intuitive and specific situation of the gas leakage, thereby making accurate response and determination, and improving the safety of gas usage.

One or more embodiments of the present disclosure provide a non-transitory computer-readable storage medium, which stores computer instructions. After reading the computer instructions in the storage medium, a computer may execute the alarm-based prevention and control method for the safety risk of smart gas.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An alarm-based prevention and control method for a safety risk of smart gas, performed by a smart gas safety management platform of an alarm-based prevention and control Internet of Things (IoT) system for a safety risk of smart gas, comprising:

obtaining gas monitoring data based on a data acquisition instruction, and determining whether a gas leakage occurs;

in response to a determination that the gas leakage occurs, generating a control instruction based on a fan operation strategy to control operation of a fan, and obtaining the gas monitoring data under the fan operation strategy, the fan being configured to remove leaking gas and assist in determining a type of the gas leakage; and generating a notification instruction based on the gas monitoring data in conjunction with an operating strategy of an indicator light, and controlling the indicator light to issue an alarm notification based on the notification instruction; the type of the gas leakage including a continuous leakage and an occasional leakage; wherein the fan being configured to remove leaking gas and assist in determining a type of the gas leakage includes:

determining the type of the gas leakage by processing the fan operation strategy, an operating condition of the indicator light, and the gas monitoring data of at least one time point through a type determination model, the type determination model being a machine learning model, the type determination model including an extraction layer and a determination layer; the extraction layer being configured to determine gas concentration change characteristics by processing the gas monitoring data of the at least one time point, wherein the gas concentration change characteristics include a change rate of gas concentration and a change range of gas concentration; and the determination layer being configured to determine the type of the gas leakage by processing the fan operation strategy, the operating condition of the indicator light, and the gas concentration change characteristics; and determining, based on the gas concentration, the gas concentration change characteristics, and historical gas leakage data, the operating strategy of the indicator light by a preset manner; the preset manner including a table looking up manner and a vector match manner; wherein the operating strategy of the indicator light includes a flicker frequency and a flicker state; wherein a gas concentration characteristics value is determined based on a weighted sum of an influence degree of the gas concentration on the flicker frequency and an influence degree of the gas concentration change characteristic on the flicker frequency; the flicker frequency is determined based on the gas concentration characteristics value; a confidence level of the flicker frequency is determined based on the fan operation strategy; and the flicker frequency is adjusted based on the confidence level.

2. The method of claim 1, wherein the fan operation strategy is determined by a process including:

determining a leakage risk value based on gas equipment usage data; and determining the fan operation strategy based on the leakage risk value, the fan operation strategy including at least one of an operating power, an operating duration, and a rotation direction of the fan.

3. The method of claim 1, wherein the generating a notification instruction based on the gas monitoring data in conjunction with an operating strategy of an indicator light, and controlling the indicator light to issue an alarm notification based on the notification instruction includes:

sending a reminder message to a user terminal based on the flicker state and the flicker frequency of the indicator light, the reminder message including whether of the gas leakage occurs, and the gas concentration.

4. An alarm-based prevention and control Internet of Things (IoT) system for a safety risk of smart gas, wherein the IoT system includes a smart gas user platform, a smart gas service platform, a smart gas safety management platform, a smart gas indoor equipment sensor network platform, and a smart gas indoor equipment object platform, wherein the smart gas user platform includes a plurality of smart gas user sub-platforms;

the smart gas service platform includes a plurality of smart gas service sub-platforms;

the smart gas safety management platform includes a plurality of smart gas indoor safety management sub-platforms and a smart gas data center;

the smart gas indoor equipment sensor network platform is configured to interact with the smart gas data center and the smart gas indoor equipment object platform;

the smart gas indoor equipment object platform is configured to obtain gas monitoring data based on a data acquisition instruction;

the smart gas safety management platform is configured to obtain the gas monitoring data from the smart gas data center and determine whether a gas leakage occurs; in response to a determination that the gas leakage occurs, generate, based on a fan operation strategy, a control instruction to control operation of a fan, and obtain the gas monitoring data under different fan operation strategies, the fan being configured to remove leaking gas and assist in determining a type of the gas leakage; generate a notification instruction based on the gas monitoring data in conjunction with an operating strategy of an indicator light; and transmit the notification instruction to the smart gas service platform via the smart gas data center; the type of the gas leakage including a continuous leakage and an occasional leakage;

the smart gas safety management platform is further configured to determine the type of the gas leakage by processing the fan operation strategy, an operating condition of the indicator light, and the gas monitoring data of at least one time point through a type determination model, the type determination model being a machine learning model; wherein the type determination model includes an extraction layer and a determination layer; the extraction layer is configured to determine gas concentration change characteristics by processing the gas monitoring data of the at least one time point; the gas concentration change characteristics including a change rate of gas concentration and a change range of gas concentration; and the determination layer is configured to determine the type of the gas leakage by processing the fan operation strategy, the operating condition of the indicator light, and the gas concentration change characteristics;

the smart gas safety management platform is further configured to determine, based on the gas concentration, the gas concentration change characteristics, and historical gas leakage data, the operating strategy of the indicator light by a preset manner; the preset manner including a table looking up manner and a vector match manner; wherein the operating strategy of the indicator light includes a flicker state and a flicker frequency; the smart gas safety management platform is further configured to: obtain a gas concentration characteristics value based on a weighted sum of an influence degree of the gas concentration on the flicker frequency and an influence degree of the gas concentration change characteristic on the flicker frequency; determine the flicker frequency based on the gas concentration characteristics value; determine a confidence level of the flicker frequency based on the fan operation strategy; and adjust the flicker frequency based on the confidence level; and the smart gas service platform is configured to upload the notification instruction to the smart gas user platform, and the smart gas user platform issues an alarm notification based on the notification instruction.

5. The IoT system of claim 4, wherein the smart gas safety management platform is further configured to:

determine a leakage risk value based on gas equipment usage data; and determine the fan operation strategy based on the leakage risk value, the fan operation strategy including at least one of an operating power, an operating duration, and a rotation direction of the fan.

6. The IoT system of claim 4, wherein the smart gas safety management platform is further configured to:

send a reminder message to a user terminal based on the flicker state and the flicker frequency of the indicator light, the reminder message including whether the gas leakage occurs, and the gas concentration.

* * * * *